United States Patent [19]

Bömer et al.

[11] 4,420,225

[45] Dec. 13, 1983

[54] LENS OF A HOMO- OR COPOLYMER OF A FLUORINE CONTAINING STYRENE POLYMER

[75] Inventors: Bruno Bömer, Leverkusen; Carlhans Süling; Joachim König, both of Odenthal; Hans Hespe, Leverkusen; Carl Heynemann, Taufkirchen; Raimund Weber, Leverkusen, all of Fed. Rep. of Germany

[73] Assignee: Bayer Aktiengesellschaft, Leverkusen, Fed. Rep. of Germany

[21] Appl. No.: 305,756

[22] Filed: Sep. 25, 1981

Related U.S. Application Data

[62] Division of Ser. No. 179,621, Aug. 20, 1980, abandoned.

[30] Foreign Application Priority Data

Sep. 7, 1979 [DE] Fed. Rep. of Germany ....... 2936131

[51] Int. Cl.³ .................. B29D 11/00; G02B 3/00
[52] U.S. Cl. .......................... 350/409; 350/168; 526/247; 526/251
[58] Field of Search .............. 350/168, 409 R; 526/247, 251

[56] References Cited

U.S. PATENT DOCUMENTS

| | | | |
|---|---|---|---|
| 2,414,330 | 1/1947 | Renoll | 526/251 |
| 2,580,504 | 1/1952 | Bachman | 526/251 |
| 2,914,512 | 11/1959 | Lo | 526/251 |
| 3,280,083 | 10/1966 | Butler | 526/251 |
| 3,308,106 | 3/1967 | Butler | 526/251 |
| 4,327,202 | 4/1982 | Foley, Jr. | 526/245 |

*Primary Examiner*—C. A. Henderson
*Attorney, Agent, or Firm*—Sprung, Horn, Kramer & Woods

[57] ABSTRACT

A homopolymer or copolymer which contains, as a monomer unit, at least one styrene of the formula

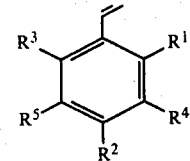

in which
$R^1$, $R^2$ and $R^3$ independently of one another denote hydrogen, fluorine or partly or completely fluorinated alkyl or alkoxy and
$R^4$ and $R^5$ independently of one another represent hydrogen or fluoride, the total number of fluorine atoms in the radicals $R^1$ to $R^5$ being at least 3 and the total number of carbon atoms in the radicals $R^1$ to $R^3$ being at most 8. The homo- or copolymers can be prepared by vinyl polymerization. They are useful as lenses or other components in an optical system where they have a refractive index $n_D$ of 1.42 to 1.55 with an Abbe number $v_D$ of 30 to 50.

13 Claims, No Drawings

LENS OF A HOMO- OR COPOLYMER OF A FLUORINE CONTAINING STYRENE POLYMER

This is a division of application Ser. No. 179,621 filed Aug. 20, 1980, now abandoned.

BACKGROUND OF THE INVENTION

1. Field of the Invention

The present invention relates to polymers of vinyl monomers, which contain, as monomer units, substituted styrenes with at least 3 fluorine atoms, a process for their preparation and their use as optical material for the production of optical systems.

2. Discussion of Prior Art

Optical systems, for example lenses for photographic cameras, have already been produced from transparent plastics. Only thermoplastics have practical significance, because they can be processed rationally and considerably better than glass. Polymethyl methacrylate is in an exceptional position because it is the only thermoplastic to be employed industrially, instead of silicate glasses or low refractive index, for the production of converting lenses.

Polystyrene, styrene/acrylonitrile copolymers and bisphenol A polycarbonates are also customary (Plaste und Kautschuk 19, 41–44 (1972)), and are employed exclusively for dispersing lenses. These materials either have the combination of a low refractive index and a small dispersion (equivalent to a high Abbe number), such as, for example, polymethyl methacrylate, or the combination of a high refractive index and a high dispersion (equivalent to a low Abbe number), such as polystyrene or aromatic polycarbonates.

In the calculation of optical systems, for example systems of lenses for cameras, it is not possible to predetermine certain image properties and to calculate refractive indices, optical dispersions and geometric data of the system therefrom, but the converse procedure must be followed. The refractive indices, optical dispersions and geometric data are predetermined and the image properties are calculated therefrom. It is thus necessary to carry out many calculations and to vary the parameters systematically in order to arrive at a system which can be used for the intended purpose. Strict limitations are thus imposed, because favourable calculated systems can only be realized if the optical materials having the necessary refractive indices and optical dispersions are also available. There is thus a particular need for optical substances which can easily be processed, for example by thermoplastic shaping, and have other combinations of refractive index and optical dispersion than the materials hitherto known and accessible.

SUMMARY OF THE INVENTION

Homopolymers and copolymers of vinyl monomers, which contain, as monomer units, substituted styrenes with at least 3 fluorine atoms, have now been found. Surprisingly, these polymers have the combination of low refractive index and high dispersion (equivalent to a low Abbe number) which is very interesting from an industrial point of view. Neither the known inorganic glasses nor the thermoplastic polymers hitherto employed for optical purposes have this combination.

The invention accordingly relates to homopolymers and copolymers, which contain, as monomer units, at least one styrene of the formula

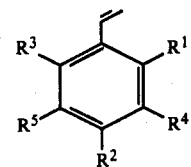

(I)

in which $R^1$, $R^2$ and $R^3$ independently of one another denote hydrogen, fluorine or partly or completely fluorinated alkyl or partly or completely fluorinated alkoxy and $R^4$ and $R^5$ independently of one another represent hydrogen or fluorine, the total number of fluorine atoms in the radicals $R^1$ to $R^5$ being at least 3 and the total number of carbon atoms in the radicals $R^1$ to $R^3$ being at most 8.

The invention preferably relates to homopolymers and copolymers which contain at least one styrene of the formula

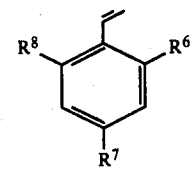

(II)

in which $R^6$, $R^7$ and $R^8$ independently of one another denote hydrogen or fluorinated alkyl, the total number of fluorine atoms in the radicals $R^6$ to $R^8$ being at least 3 and the total number of carbon atoms in the radicals $R^6$ to $R^8$ being 1 to 6.

The invention furthermore preferably relates to homopolymers and copolymers which contain at least one styrene of the formula

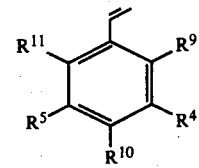

in which $R^4$, $R^5$, $R^9$, $R^{10}$ and $R^{11}$ denote hydrogen or fluorine, the number of fluorine atoms being at least 3.

The invention particularly preferably relates to homopolymers and copolymers which contain at least one styrene from the group comprising o-trifluoromethylstyrene, p-trifluoromethyl-styrene, p-heptafluoroisopropyl-styrene and o,p-bis-trifluoromethyl-styrene. Of this group, o-trifluoromethyl-styrene and p-trifluoromethyl-styrene may be particularly singled out for the polymers mentioned.

Partly or completely fluorinated alkyl which may be mentioned is, for example, such a radical with 1 to 4 carbon atoms, such as monofluoromethyl, difluoromethyl, trifluoromethyl, α- or β-monofluoroethyl, ethyl which is di-, tri- or tetra-substituted by fluorine, perfluoroethyl, propyl or isopropyl which is mono- to hexa-substituted by fluorine, perfluoropropyl, perfluoroisopropyl, butyl or isobutyl which is mono- to octa-substituted by fluorine, perfluorobutyl, perfluoroisobutyl or perfluoro-tert.-butyl. The perfluorinated alkyl radicals, such as trifluoromethyl, pentafluoroethyl, heptafluoropropyl, heptafluoroisopropyl, perfluorobutyl, perfluoroisobutyl and perfluoro-tert.-butyl, are preferred. Trifluoromethyl is particularly preferred.

Partly or completely fluorinated alkoxy which may be mentioned is, for example, such a radical with 1 to 4 carbon atoms, such as monofluoromethoxy, difluoromethoxy, trifluoromethoxy, ethoxy which is mono- to penta-substituted by fluorine, propoxy or isopropoxy which is mono- to hepta-substituted by fluorine or butoxy or isobutoxy which is mono- to nona-substituted by fluorine, preferably trifluoromethoxy, pentafluoroethoxy, perfluoropropoxy, perfluoroisopropoxy, perfluorobutoxy, perfluoroisobutoxy and perfluoro-tert.-butoxy, and particularly preferably trifluoromethoxy.

According to the invention, the styrenes which the polymers described contain as monomers have at least 3 fluorine atoms.

If the styrenes which the polymers described contain carry several alkyl or alkoxy radicals, the total number of carbon atoms therein is at most 8, preferably at most 6 and particularly preferably at most 2.

The polymers according to the invention can contain one or more of the said styrenes with at least 3 fluorine atoms, so that, for example, the polymers according to the invention include a homopolymer of one of the styrenes of the formula (I) or a copolymer of two or more styrenes of the formula (I). It is furthermore possible for the polymers to contain units derived from other vinyl monomers, in addition to one or more of the fluorine-containing styrenes mentioned.

Examples which may be mentioned of vinyl monomers which the polymers according to the invention can contain, in addition to the fluorine-containing styrenes mentioned, are acrylic acid esters, such as acrylic acid methyl ester, acrylic acid ethyl ester and acrylic acid butyl ester; methacrylic acid esters, such as methacrylic acid methyl ester, methacrylic acid ethyl ester and methacrylic acid butyl ester; acrylonitrile; styrene or styrenes which are substituted by alkyl, alkoxy, halogenalkyl, halogenalkoxy or halogen, such as ortho-, meta- or para-methylstyrene, ortho-, meta- or para-ethylstyrene, ortho-, meta- or para-butylstyrene, ortho-, meta- or para-methoxystyrene m-trifluoromethylstyrene, m,m-bistrifluoromethylstyrene, trichloromethylstyrene, m-trifluoromethoxystyrene, and ortho-, meta- or para-chlorostyrene; butadiene, isoprene, methacrylonitrile, α,β-unsaturated ketones, maleic anhydrides or itaconic anhydride. Preferred comonomers are the said acrylic acid esters, methacrylic acid esters, styrene, styrene which is substituted by alkyl, alkoxy, halogenalkyl, halogenoalkoxy or halogen, and acrylonitrile. The polymers according to the invention can contain one or more of the comonomers mentioned, in addition to one or more styrenes of the formula (I). The polymers according to the invention preferably contain a styrene of the formula (I) and optionally one of the comonomers mentioned.

In the case where the polymers according to the invention are copolymers, they contain at least 30% by weight, preferably at least 45% by weight, of one or more styrenes of the formula (I). Generally, in the case of a copolymer the copolymer contains units derived from the styrenes of formula I in an amount of 30 percent by weight up to 99.75 percent by weight, preferably of from 30 to 99 percent by weight, particularly preferably of from 45 to 99 percent by weight.

Surprisingly, the polymers according to the invention have the particular combination of low refractive index and high dispersion (which corresponds to a low Abbe number), and they are thus particularly suitable for the production of optical systems in which colour faults and curvature of the field are to be corrected at the same time. A $n_D$ of about 1.42 to about 1.55 may be mentioned as a low refractive index, and a $v_D$ of about 30 to about 50 may be mentioned as a low Abbe number. As a result of the combination indicated, this group of polymers are below the so-called "low flint" region in the n/v diagram and thus, when combined with glasses of high refractive index, enable systems which fulfil the conditions of new achromatic lenses to be calculated (N. Berek, Grundlagen der praktischen Optik (Fundamental Principles of Practical Optics), Verlag Walter de Gruyter, Berlin 1930, pages 108 to 110). Dispersion lenses or converting lenses can be produced from the group of polymers according to the invention.

During use, optical systems are frequently subjected to exposure to heat, for example by solar radiation on a black camera housing or by the radiation of heat from powerful studio illumination or from a powerful light source located within the optical system. Thermoplastics in the field of application mentioned must have a minimum stability to heat in order to fulfil the high demands with regard to dimensional accuracy of optical lenses. The glass transition temperature $T_G$ may be mentioned as an example of a measure of the stability to heat, and its value for the application mentioned should be, for example, at least about 75° C. The polymers according to the invention fulfil this requirement.

The glass transition temperature of the polymers according to the invention is, for example, at least 80° C., preferably at least 100° C.

The polymer have a molecular weight between about 5.000 and 2.000.000, preferably between 10.000 and 1.000.000 said molecular weight being determined by membrane osmosis in dimethylformamide as solvent.

In many cases it can be desirable to reduce a glass transition temperature which has too high a value in order to achieve favourable processing conditions during thermoplastic shaping of the polymers according to the invention. If one of the homopolymers of the styrenes of the formula (I) does not fulfil the desired requirements, the stability to heat, measured, for example, as the transformation temperature $T_T$, as the glass transition temperature $T_G$ or as the softening point according to Vicat B, can thus advantageously be adjusted to the desired level by copolymerisation of the abovementioned fluorine-containing styrenes with the abovementioned comonomers. This copolymerisation is at the same time suitable for varying the combination of refractive index and dispersion. For the use, according to the invention, as a material for optical systems, the polymers according to the invention in general have intrinsic viscosities [$\eta$] of about 0.1 to about 1.5 dl/g, preferably of 0.2 to 1.0 dl/g, measured in acetone at 25° C.

The polymers according to the invention can, of course, contain customary additives or processing auxiliaries, such as stabilizers, lubricants and release agents or ultraviolet absorbers, in each case in amounts of about 0.01 to about 2% by weight. The optical bodies which can be obtained from the polymers according to the invention can subsequently be worked in a known manner after shaping, for example they can be centered or coated.

The invention furthermore relates to the use of homopolymers or copolymers of vinyl monomers, which contain, as monomer units, substituted styrenes with at least 3 fluorine atoms, for the production of optical systems.

The invention preferably relates to the use of homopolymers or copolymers of vinyl monomers, which contain, as monomer units, one or more substituted styrenes with at least 3 fluorine atoms in an amount of at least 30% by weight of the polymer and which have a refractive index $n_D$ of 1.42 to 1.55, an Abbe number $v_D$ of 30 to 50 and a glass transition temperature $T_G$ of at least 80° C., for the production of optical systems.

The invention particularly preferably relates to the use of homopolymers or copolymers of vinyl monomers, which contain, as monomer units, at least one styrene of the formula (I) in an amount of at least 30% by weight of the polymer and have a refractive index $n_D$ of 1.42–1.55 an Abbe number $v_D$ of 30 to 50 and a glass transition temperature $T_G$ of at least 80° C., for the production of optical systems.

It is, of course, within the general concept of the invention to employ polymers which contain, as monomer units, substituted styrenes with at least 3 fluorine atoms and which have the surprising combination, which is very interesting from an industrial point of view, of low refractive index and high dispersion (corresponding to a low Abbe number), but which have a glass transition temperature below 80° C. for the production of optical systems if excessive warming and thus deformation of the optical bodies are avoided by suitable measures. Such suitable measures can be, for example, adequate cooling of the optical system or the use of light sources which generate little heat radiation.

Examples of optical systems which may be mentioned are lenses, lens systems, prisms or other optical bodies for a photographic camera or film camera, projections, spectacles, binoculars, microscopes or other optical instruments.

The invention furthermore relates to a process for the preparation of the polymers according to the invention.

A process has been found for the preparation of homopolymers or copolymers which contain, as monomer units, at least one styrene of the formula (I), which is characterised in that at least one styrene of the formula (I), if appropriate as a mixture with at least one other vinyl monomer as a comonomer, is subjected to free radical polymerization at elevated temperature, in the absence of air and if appropriate in the presence of a solvent.

Substituted styrenes of the formula (I) for the process according to the invention are known. Thus, the 3 isomeric trifluoromethylstyrenes are known from J. Am. Chem. Soc. 72, 2283 (1950) and can be obtained, for example, by splitting off water from the correspondingly substituted phenylmethylcarbinoles in the presence of phosphorus pentoxide (J. Am. Chem. Soc. 68, 736 (1946)). Substituted styrenes of the formula (I) can furthermore be obtained by reacting the correspondingly substituted benzyl halides with triphenylphosphine at elevated temperature, if appropriate in the presence of a high-boiling solvent, to give the correspondingly substituted benzyl-triphenyl-phosphonium halides, and further reaction of these compounds with excess paraformaldehyde in aqueous suspension and with at least an equimolar amount of a strong base at 0° to 100° C. The vinyl monomers which can optionally be employed as comonomers in the process according to the invention and which have already been mentioned above are known to the expert. The free radical polymerization can be started purely by means of heat, by irradiation with light containing ultraviolet rays or by the addition of agents which form free radicals. Examples which may be mentioned of agents which form free radicals are redox systems or inorganic or organic peroxy compounds, such as dilauroyl peroxide, benzoyl peroxide or tert.-butyl peroctanoate, or azo compounds, such as azoisobutyric acid nitrile. Polymerization by means of heat and polymerization with the addition of peroxy compounds or azo compounds are the preferred possibilities.

The temperature range from 30° C. to about 150° C. may be mentioned as an elevated temperature. Polymerization purely by means of heat is preferably carried out in the upper part of the temperature range mentioned, for example at 80° to 150° C., whilst free radical polymerisation with the addition of an agent which forms free radicals is carried out in the lower part of the temperature range mentioned, for example at 30° to 120° C.

In the case where the polymerization is carried out in the presence of a solvent, examples of solvents which may be mentioned are those from the ester group, such as ethyl acetate, or from the ketone group, such as acetone or ethyl methyl ketone.

The polymers can be obtained from the reaction batch, for example, by evaporating the solution or by precipitation, for example with the aid of methanol.

The polymers can be purified by further re-precipitation or they can be fractionated.

EXAMPLES

The glass transition temperatures $T_G$ were measured with a thermomechanical analyzer of the Dupont 942 Type. Technical data of the apparatus: measuring probes $\phi$ 1 mm, load 20 p, rate of heating=5° K./minute. The number average molecular weights $\overline{M}_n$ have been determined by membrane osmosis in dimethylformamide as solvent.

EXAMPLE 1

200 g of o-trifluoromethylstyrene are carefully freed from oxygen and are heated to 130° C., whilst stirring. After 2.25 hours, the polymer syrup starts to rise up the stirrer shaft. The batch is then diluted with 200 ml of acetone and stirred into 2 l of methanol. After drying in vacuo at 80° C., 121 g of poly-o-trifluoromethylstyrene are obtained. $[\eta]=0.45$ [dl/g] in acetone at 25° C.; $\overline{M}_n=220.000$, $n_D=1.51$; $v_D=35\pm2$; $T_G=175\pm10°$ C.

EXAMPLE 2 (COMPARISON EXAMPLE)

500 g of m-trifluoromethystyrene and 5 g of dilauroyl peroxide are polymerized at 70° C. in the absence of oxygen. After about 3 hours, the viscosity has risen to such an extent that the mass can still be stirred only with very great difficulty. The stirrer is then switched off and the internal temperature is kept between 70° and 85° C. by alternate heating and cooling. After a total polymerization time of 10 hours, the polymer is dissolved hot in 750 ml of acetone and the acetone solution is mixed with water for precipitation. The polymer is kneaded thoroughly with water and dried at 50° C. in vacuo. Yield: 480 g of polymer: $[\eta]=0.41$ [dl/g] in tetrahydrofurane at 25° C.; $\overline{M}_n=160.000$ $n_D=1.50$; $v_D=38\pm2$; $T_G=63\pm5°$ C.

EXAMPLE 3

200 mg of azoisobutyric acid nitrile are dissolved in 100 g of p-trifluoromethylstyrene. The solution is stirred at 70° C. in the absence of oxygen. After 6 hours, the stirrer is switched off because the viscosity of the mass is too high, and the internal temperature is kept between 70° and 80° C. for a further 18 hours. After dissolving the mass in 200 ml of acetone, the polymer is precipitated in 2 l of water, kneaded thoroughly with methanol and dried at 60° C. in vacuo. Yield: 93 g; $[\eta]=0.37$ [dl/g] in acetone at 25° C.; $\overline{M}_n=140.000$, $n_D=1.50$; $\nu_D=36\pm2$; $T_G=101\pm10°$ C.

EXAMPLE 4

A mixture of 50 g of o-trifluoromethylstyrene, 50 g of methacrylic acid methyl ester and 0.4 g of tert.-butyl peroctanoate is carefully freed from oxygen and is stirred, under nitrogen, at an internal temperature of 100° C. until the mass can still be stirred only with difficulty (about 1 hour). The batch is dissolved hot in 150 ml of acetone and precipitated in 1 l of methanol. 58 g of copolymer are obtained. $[\eta]=0.295$ [dl/g] in acetone at 25° C.; $\overline{M}_n=51.000$ elementary analysis: 15.7% of fluorine $\triangleq 47.4\%$ by weight of o-trifluoromethylstyrene; $n_D=1.50$; $\nu_D=46\pm2$; $T_G=130\pm10°$ C.

EXAMPLE 5

An oxygen-free mixture of 140 g of o-trifluoromethylstyrene and 60 g of styrene is polymerized by means of heat at an internal temperature of 125°–130° C., whilst stirring in a nitrogen atmosphere. After 135 minutes, the mass can still be stirred only with difficulty. 300 ml of acetone are then slowly added and the batch is further stirred at about 50° C. until solution is complete.

After precipitation in methanol and drying at 80° C. in vacuo, 94.5 g of copolymer are obtained. $[\eta]=0.37$ [dl/g] in acetone at 25° C.; $\overline{M}_n=110.000$ fluorine content: 21.9% $\triangleq 66.1\%$ by weight of o-trifluoromethylstyrene; $n_D=1.54$; $\nu_D=34\pm2$; $T_G=131\pm10°$ C.

EXAMPLE 6

A mixture of 45 g of o-trifluoromethylstyrene and 15 g of n-butyl acrylate is carefully freed from oxygen and polymerized by means of heat at 115°–120° C., under $N_2$. After 4 hours, 100 ml of acetone are slowly added to the batch, the resulting solution is mixed with 600 ml of methanol for precipitation and the polymer is dried at 80° C. in vacuo. Yield: 23 g; $[\eta]=0.52$ [dl/g] in acetone at 25° C.; $\overline{M}_n=210.000$ fluorine=26.3% $\triangleq 79.4\%$ by weight of o-trifluoromethylstyrene; $n_D=1.505$; $\nu_D=40.5\pm2$; $T_G=122\pm10°$ C.

EXAMPLE 7

(a) 36 g of o-trifluoromethylstyrene, 24 g of ethyl acrylate and 120 mg of dibenzoyl peroxide are heated to the boiling point in the absence of oxygen for 3.2 hours, whilst stirring. After adding 100 ml of acetone, the polymer is precipitated in 600 ml of methanol and dried at 60° C. in vacuo. Yield: 25.3 g; $[\eta]=0.30$ [dl/g] in acetone at 25° C.; $\overline{M}_n=140.000$ fluorine=21.1% by weight $\triangleq 63.7\%$ by weight of o-trifluoromethylstyrene; $n_D=1.50$; $\nu_D=44.5\pm2$; $T_G=80\pm10°$ C.

(b) A solution of 60 g of o-trifluoromethylstyrene, 40 g of ethyl acrylate and 1 g of dibenzoyl peroxide in 50 ml of ethyl acetate is boiled under reflux in the absence of oxygen for 4.5 hours, 100 ml of acetone are then added and the polymer is precipitated in 1 l of methanol. After drying in vacuo at 80° C., 48.7 g of copolymer are obtained. $[\eta]=0.165$ dl/g in acetone at 25° C.; $\overline{M}_n=63.000$ fluorine=21.0% by weight 63.4% by weight of o-trifluoromethylstyrene; $n_D=1.50$; $\nu_D=44.0\pm2$; $T_G=79\pm10°$ C.

EXAMPLE 8

A mixture of 80 g of o-trifluoromethylstyrene, 20 g of acrylonitrile and 300 mg of dilauroyl peroxide is stirred at 85° C. with careful exclusion of oxygen. After 4.25 hours, the mass starts to rise up the stirrer shaft. 100 ml of acetone are then added and the polymer is precipitated in 1 l of methanol. After drying in vacuo at 80° C., 46 g of copolymer are obtained. $[\eta]=0.65$ [dl/g] in acetone at 25° C.; $\overline{M}_n=135.000$ fluorine content: 27.2% $\triangleq 82.2\%$ by weight of o-trifluoromethylstyrene; $n_D=1.504$; $\nu_D=39\pm2$; $T_G=140\pm10°$ C.

EXAMPLE 9

Poly-p-perfluoroisopropylstyrene with the following values is obtained from p-perfluoroisopropyl-styrene by a procedure corresponding to that in Example 2: $[\eta]=0.35$ [dl/g] in acetone at 25° C.; $\overline{M}_n=140.000$ (determined by membrane osmosis in acetone) $n_D=1.44$; $\nu_D=43\pm2$; $T_G=108\pm10°$ C.

EXAMPLE 10 (COMPARATIVE EXAMPLE)

Poly-m,m-bis-trifluoromethyl-styrene with the following values is obtained from m,m-bis-trifluoromethyl-styrene by a procedure corresponding to that in Example 2: $[\eta]0.70$ [dl/g] in acetone at 25° C.; $\overline{M}_n=250.000$ (determined by membrane osmosis in acetone) $n_D=1.45$; $\nu_D=42.5\pm2$; $T_G=60\pm10°$ C.

EXAMPLE 11

0.25 g of dilauroyl peroxide is added to 25 g of an equimolar mixture of 2,4- and 2,5-bis-trifluoromethyl-styrene and the mixture is polymerised at 70° C. in the absence of oxygen for 16 hours. The polymer is then dissolved in 200 ml of acetone and subsequently precipitated in 1.2 l of methanol. After drying at 100°–120° C., 21.5 g of polymer powder are obtained. $[\eta]=0.45$ [dl/g] in acetone at 25° C.; $\overline{M}_n=170.000$ (determined by membrane osmosis in acetone) $n_D=1.45$; $\nu_D=41.5\pm2$; $T_G=172\pm10°$ C.

EXAMPLE 12

214 g (1.1 mols) of o-trifluoromethylbenzyl chloride are initially introduced into the reaction vessel and are heated to about 150° C. A hot solution, at about 100° C., of 262 g (1 mol) of triphenylphosphine in 115 ml of xylene is added thereto, whilst stirring. Stirring is continued at 150° C. for a short time, the mixture is cooled to 20° C. and the crystal sludge is filtered off and washed with cyclohexane/methylene chloride (7:3). After drying at 170° C. and under 0.1 mm Hg, 412 g (90.2% of the theoretical yield) of o-trifluoromethyl-benzyltriphenyl-phosphonium chloride are obtained.

EXAMPLE 13

457 g (1 mol) of o-trifluoromethylbenzyltriphenyl-phosphonium chloride and 150 g (5 mols) of paraformaldehyde are initially introduced into 1,200 ml of water. 150 ml of 50% strength by weight sodium hydroxide solution are added at about 20° C. The mixture is allowed to after-react at 40° to 50° C. for 1 hour and the o-trifluoromethylstyrene formed is then distilled out of the reaction mixture with steam. The organic phase of the distillate contains 170 g (about 98% of the theoretical yield) of o-trifluoromethylstyrene with a purity, according to analysis by gas chromatography, of 99%. $n_D^{20}$:1.4663. Boiling point: 61° C. under 53 mbars.

What is claimed is:

1. A lens comprising a homopolymer which contains, as a monomer unit, at least one styrene of the formula

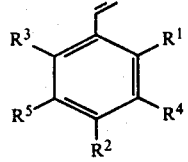

in which
R$^1$, R$^2$ and R$^3$ independently of one another denote hydrogen or partly or completely fluorinated alkyl or alkoxy and
R$^4$ and R$^5$ independently of one another represent hydrogen or fluorine,
the total number of fluorine atoms in the radicals R$^1$ to R$^5$ being at least 3 and the total number of carbon atoms in the radicals R$^1$ to R$^3$ being at most 8, said homopolymer having an $n_D$ value of between about 1.42 and about 1.55 and a $v_D$ value of between about 30 and about 50, and said homopolymer selected from the group consisting of ortho-, meta- and para-trifluoromethyl styrene.

2. A lens comprising a copolymer which contains, as a monomer unit, at least one styrene of the formula

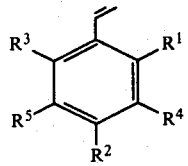

in which
R$^1$, R$^2$ and R$^3$ independently of one another denote hydrogen or partly or completely fuorinated alkyl or alkoxy and
R$^4$ and R$^5$ independently of one another represent hydrogen or fluorine,
the total number of fluorine atoms in the radicals R$^1$ to R$^5$ being at least 3 and the total number of carbon atoms in the radicals R$^1$ to R$^3$ being at most 8, said copolymer having an $n_D$ value of between about 1.42 and about 1.55 and a $v_D$ value of between about 30 and about 50, and said copolymer selected from the group consisting of ortho-, meta and para-trifluoromethyl styrene.

3. A lens comprising a homopolymer which contains, as a monomer unit, at least one styrene of the formula

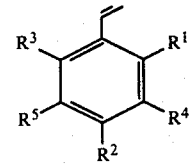

in which
R$^1$, R$^2$ and R$^3$ independently of one another denote hydrogen or partly or incompletely fluorinated alkyl or alkoxy and
R$^4$ and R$^5$ independently of one another represent hydrogen or fluorine,
the total number of fluorine atoms in the radicals R$^1$ to R$^5$ being at least 3 and the total number of carbon atoms in the radicals R$^1$ to R$^3$ being at most 8, said homopolymer having an $n_D$ value of between about 1.42 and about 1.55 and a $v_D$ value of between about 30 and about 50, and said homopolymer comprising poly-p-perfluoroisopropyl styrene.

4. A lens according to claim 1 wherein said homopolymer is a homopolymer of ortho-trifluoromethyl styrene.

5. A lens according to claim 1 wherein said homopolymer is a homopolymer of meta-trifluoromethyl styrene.

6. A lens according to claim 1 wherein said lens is made of a para-trifluoromethyl styrene homopolymer.

7. A lens according to claim 1 wherein R$^4$ and R$^5$ are hydrogen.

8. A lens according to claim 2 wherein said copolymer is derived from ortho-trifluoromethyl styrene and methacrylic acid methyl ester.

9. A lens according to claim 1 wherein said homopolymer contains monomer units comprising ortho-trifluoromethyl styrene and styrene.

10. A lens according to claim 1 wherein said homopolymer contains monomer units comprising ortho-trifluoromethyl styrene and n-butyl acrylate.

11. A lens according to claim 1 wherein said homopolymer contains monomer units comprising ortho-trifluoromethyl styrene and ethyl acrylate.

12. A lens according to claim 1 wherein said homopolymer contains monomer units comprising ortho-trifluoromethyl styrene and acrylonitrile.

13. A lens according to claim 2 wherein said copolymer is derived from a mixture of 2,4-bis-trifluoromethyl styrene and 2,5-bis-trifluoromethyl styrene.

* * * * *